(12) United States Patent
Hasunuma

(10) Patent No.: US 8,783,116 B2
(45) Date of Patent: Jul. 22, 2014

(54) ULTRASONIC FLOW METER HAVING PROTECTION JOINT INTERPOSED BETWEEN THE MEASUREMENT UNIT AND THE EXTERNAL PIPE

(75) Inventor: Masahiro Hasunuma, Gyoda (JP)

(73) Assignee: Surpass Industry Co., Ltd., Gyoda-Shi, Saitama (JP)

( * ) Notice: Subject to any disclaimer, the term of this patent is extended or adjusted under 35 U.S.C. 154(b) by 349 days.

(21) Appl. No.: 13/193,123

(22) Filed: Jul. 28, 2011

(65) Prior Publication Data

US 2012/0036942 A1 Feb. 16, 2012

(30) Foreign Application Priority Data

Aug. 16, 2010 (JP) ................................. 2010-181627

(51) Int. Cl.
*G01F 1/66* (2006.01)
(52) U.S. Cl.
USPC ....................................................... 73/861.27
(58) Field of Classification Search
None
See application file for complete search history.

(56) References Cited

U.S. PATENT DOCUMENTS

| | | | | |
|---|---|---|---|---|
| 4,090,404 | A * | 5/1978 | Dupont et al. .............. | 73/114.43 |
| 4,140,012 | A * | 2/1979 | Hendriks ................... | 73/861.27 |
| 7,024,944 | B2 * | 4/2006 | Imai et al. .................. | 73/861.27 |
| 2002/0104386 | A1 * | 8/2002 | Imai et al. .................. | 73/861.27 |
| 2004/0149028 | A1 | 8/2004 | Hiss et al. | |
| 2005/0011280 | A1 * | 1/2005 | Imai et al. .................. | 73/861.27 |
| 2005/0139014 | A1 * | 6/2005 | Imai et al. .................. | 73/861.27 |
| 2007/0227263 | A1 * | 10/2007 | Fukano et al. ............. | 73/861.27 |

FOREIGN PATENT DOCUMENTS

| | | |
|---|---|---|
| DE | 10062609 A1 | 5/2002 |
| JP | 2002-303542 A | 10/2002 |
| JP | 2005-62082 A | 3/2005 |
| JP | 2006-337258 A | 12/2006 |

OTHER PUBLICATIONS

Ilgen, M., et al., "Real-Time Production Allocation for Oil Wells", Advances in Instrumentation and Control., Instrument Society of America, Research Triangle Park, US. vol. 49. No. Part 03, pp. 861-867 (Oct. 23, 1994).
Extended European Search Report, dated Feb. 10, 2014 issued by the European Patent Office in related European Patent Application Serial No. 11177190.3, 7 pages.
Office Action, dated Mar. 25, 2014 issued by the Japanese Patent Office in related Japanese Patent Application Serial No. 2010-181627, 2 pages.

\* cited by examiner

*Primary Examiner* — Harshad R Patel
(74) *Attorney, Agent, or Firm* — Robert P. Michal; Lucas & Mercanti LLP

(57) ABSTRACT

A straight tube ultrasonic flow meter includes a measuring unit disposed within a measurement space of a casing. The measuring unit has a straight tubular body for measurement through which a fluid for measurement flows and a pair of oscillators disposed around an outer circumference of the tubular body. The measuring unit is capable of measuring a flow rate of the fluid by obtaining a flow velocity of the fluid for measurement based on a difference in propagation time of ultrasonic waves from both directions detected between the oscillators. The measuring unit is fixed to the casing and connected to an external pipe with a measuring unit protecting joint interposed therebetween. The measuring unit protecting joint restricts movement of the measuring unit to a central side in the axial direction and rotation of the measuring unit with respect to the casing, and provides a fluid flow channel.

7 Claims, 7 Drawing Sheets

ULTRASONIC FLOW METER HAVING
PROTECTION JOINT INTERPOSED
BETWEEN THE MEASUREMENT UNIT AND
THE EXTERNAL PIPE

CROSS-REFERENCE TO RELATED
APPLICATIONS

This application is based on Japanese Patent Application No. 2010-181627, the contents of which are incorporated herein by reference.

TECHNICAL FIELD

The present invention relates to a straight tube ultrasonic flow meter capable of measuring a flow rate of a fluid for measurement that flows through a pipe line using ultrasonic wave.

BACKGROUND ART

Ultrasonic flow meters using ultrasonic wave have been known as one type of conventional flow meters for measuring a flow rate of a fluid that flows through a pipe line.

Of these, an ultrasonic flow meter having a measuring unit configured using a straight tube as a tubular body for measurement through which a fluid for measuring a flow rate flows is generally called as a straight tube ultrasonic flow meter. The measuring unit of the straight tube ultrasonic flow meter is configured such that a pair of oscillators (ultrasonic transducers) are disposed around an outer circumference of a tubular body for measurement as a straight tube at a predetermined interval along an axial (longitudinal) direction.

Such a straight tube ultrasonic flow meter causes one of the oscillators to transmit ultrasonic wave and the other oscillator to receive the transmitted ultrasonic wave at the same time as causing the other oscillator to transmit ultrasonic wave and the one oscillator to receive the transmitted ultrasonic wave, obtains a flow velocity of a fluid within the tubular body for measurement based on a difference occurring in propagation time of the ultrasonic wave, and thereby measures a flow rate of the fluid based on the flow velocity.

Examples of the ultrasonic flow meter described above include a straight tube ultrasonic flow meter, as described in PTL 1, using a straight tube without any bent portion as a tubular body for measurement on which a pair of oscillators are disposed to configure a measuring unit.

CITATION LIST

Patent Literature

{PTL 1}
Japanese Unexamined Patent Application, Publication No. 2002-303542

SUMMARY OF INVENTION

Technical Problem

In the mean time, is desired that measurement accuracy of the straight tube ultrasonic flow meters described above is further improved. However, it is considered that error causes as described below affect the measurement of the propagation time of the ultrasonic wave in the conventional straight tube ultrasonic flow meters.

A first error cause is vibration that acts externally, via such as an external connecting pipe external pipe), on the tubular body for measurement on which oscillators are disposed to constitute a measuring unit. One possible cause of such an external vibration is a stress acting on the tubular body for measurement from such as the external pipe, for example.

A second error cause is small air bubbles that are formed within a pipe for measurement and gather near an inner wall surface. Such air bubbles are formed easily especially when a flow rate through the pipe for measurement is small.

There is also known an ultrasonic flow meter having a bent portion in a flow channel by providing the pipe for measurement in a U shape. However, in such a ultrasonic flow meter, it is considered that a pressure loss occurs due to the bent portion in the pipe for measurement (flow channel) and crushes air bubbles, and therefore an error due to the air bubbles in the pipe for measurement is not a problem.

In the above circumstances, it is desired that a straight tube ultrasonic flow meter eliminates error causes such as the external vibration (stress) acting on the tubular body for measurement and the air bubbles that gather around the inner wall surface.

The present invention is made in view of the above problem, and an object of the present invention is to provide a straight tube ultrasonic flow meter capable of eliminating error causes in ultrasonic wave measurement, and provided with further improved measurement accuracy.

Solution to Problem

In order to address the above problem, the present invention employs means as described below.

A straight tube ultrasonic flow meter according to the present invention includes a measuring unit disposed within a measurement space of a casing, the measuring unit having a tubular body for measurement as a straight tube through which a fluid for measurement flows and a pair of oscillators disposed around an outer circumference of the tubular body for measurement at a predetermined interval along an axial direction, the measuring unit capable of measuring a flow rate of the fluid by obtaining a flow velocity of the fluid for measurement based on a difference in propagation time of ultrasonic wave from both directions detected between the oscillators, wherein the measuring unit is fixed to the casing and connected to an external pipe with a measuring unit protecting joint interposed therebetween, the measuring unit protecting joint restricting movement of the measuring unit to a central side in the axial direction and rotation of the measuring unit with respect to the casing, and providing a fluid flow channel.

According to such a straight tube ultrasonic flow meter, the measuring unit is fixed to the casing and connected to the external pipe with the measuring unit protecting joint interposed therebetween, the measuring unit protecting joint restricting the movement of the measuring unit to the central side in the axial direction and the rotation of the measuring unit with respect to the casing, and providing a fluid flow channel. Therefore, it is possible to prevent a stress in the axial direction or a rotational direction from externally acting on the measuring unit.

In the flow meter described above, it is desirable that the measuring unit protecting joint be provided with: a protecting joint main body having: a pipe supporting section that inserts the tubular body for measurement to a predetermined position and supports the tubular body for measurement by a portion in vicinity of an end portion; a casing opening insertion section that is inserted into and assembled with an opening provided in a wall surface of the casing, the opening having a cross-sectional shape for restricting rotation, the casing opening insertion section having a cross-sectional shape identical to the cross-sectional shape for restricting rotation; a contact surface that defines an insertion position of the casing opening insertion section to a central side in the axial direction; and a pipe joint section that is connected to the external pipe for the fluid for measurement; and a fixation ring configured to engage with an inside screw section provided in the wall surface of the casing and prevent the protecting joint main body from moving in the axial direction.

According to the measuring unit protecting joint thus configured, the engagement between the wall surface opening and the casing opening insertion section both having the cross-sectional shape for restricting rotation prevents the protecting joint main body from rotating, and the engagement between the contact surface and the casing wall surface prevents the protecting joint main body from moving toward the measuring unit. Specifically, there is provided a connection structure in which the measuring unit is separated from the external pipe so that a thrust force or a rotational force from the external pipe does not act on the pipe for measurement.

In the flow meter described above, it is desirable that the measuring unit be provided with an air bubble crushing section on a downstream side of the oscillators. With this, it is possible to crush and remove small air bubbles that in particular are generated when the flow rate is small and gather around the inner wall surface. Therefore, an error cause in the measurement of the flow rate using ultrasonic wave can be eliminated.

In this case, it is desirable that the air bubble crushing section be a section (contracted section) having a cross-sectional area of the flow channel being in a range from 10% to 75% of that of the tubular body for measurement. Here, a lower limit (minimum diameter) of the contraction takes a value with which the fluid for measurement flows smoothly without clogging, and thus, a degree of the contraction varies according to the pipe diameter.

In the above configuration, the air bubble crushing section can be provided for the measuring unit protecting joint, or can be provided removably by inserting a contraction providing member into a downstream outlet of the tubular body for measurement.

Further, in the above configuration, placing the measuring unit horizontally and positioning a central axis of the air bubble crushing section downward such that a lower surface of a flow channel in the air bubble crushing section is even with that of the tubular body for measurement facilitate elimination of babbles in the fluid and removal of a remaining object.

Advantageous Effects of Invention

According to the straight tube ultrasonic flow meter of the present invention described above, it is possible to eliminate the error causes in the ultrasonic wave measurement, such as the external vibration (stress) acting on the tubular body for measurement and the air bubbles gathering around the inner wall surface. Therefore, it is possible to further improve accuracy in the measurement.

BRIEF DESCRIPTION OF DRAWINGS

FIG. 7($a$) is an enlarged view of the air bubble crushing section, and FIG. 7($b$) is a right side view of FIG. 7($a$).

DESCRIPTION OF EMBODIMENTS

One embodiment of a straight tube ultrasonic flow meter according to the present invention is now described with reference to the drawings.

A straight tube ultrasonic flow meter includes a measuring unit having a straight tube as a tubular body for measurement through which a fluid for measuring a flow rate flows and a pair of oscillators disposed on the straight tube. Specifically, the measuring unit of the straight tube ultrasonic flow meter described hereinafter is configured such that the pair of oscillators are disposed around an outer circumference of the tubular body for measurement as the straight tube at a predetermined interval along an axial (longitudinal) direction.

Figure 1:
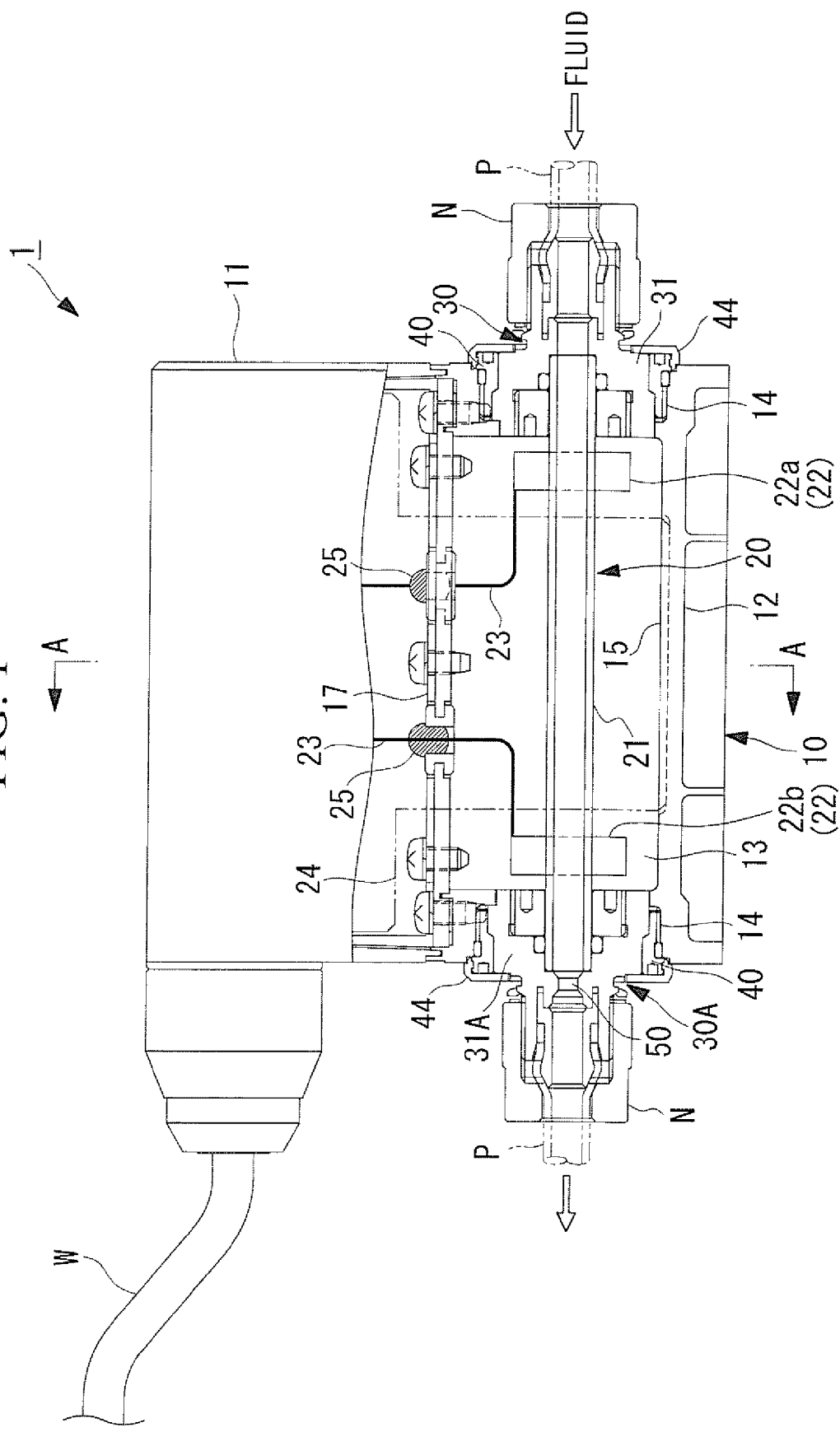
FIG. 1 is a cross-sectional view of a main part illustrating one embodiment of a straight tube ultrasonic flow meter according to the present invention.

In a straight tube ultrasonic flow meter 1 according to the embodiment illustrated in FIG. 1, a measuring unit 20 is disposed within a casing 10. Specifically, the illustrated straight tube flow meter 1 includes a tubular body for measurement 21 as a straight tube through which a fluid for measurement flows and a pair of oscillators 22$a$ and 22$b$ disposed around an outer circumference of the tubular body for measurement 21 at a predetermined interval along the axial direction, and measures a flow rate of the fluid by obtaining a flow velocity of the fluid for measurement based on propagation time of ultrasonic wave from both directions detected between the oscillators 22$a$ and 22$b$ that are spaced apart.

The casing 10 is separable into an upper casing 11 and a lower casing 12, and a measurement space 13 for storing the measuring unit 20 is defined within the lower casing 12. In the measurement space 13, the tubular body for measurement 21 of the measuring unit 20 is placed horizontally. Inside screw openings 14 for fixing the measuring unit protecting joints 30 and 30A are defined respectively in right and left wall surfaces of the measurement space 13. The measuring unit protecting joints 30 and 30A are members for fixing the measuring unit 20 to the casing 10, as well as for connecting the measuring unit 20 to an external pipe P through which the fluid for measurement flows. In the description below, one of the measuring unit protecting joints 30 and 30A that has a contracted section 50 constituting an air bubble crushing section that will be later described is distinguished as the measuring unit protecting joint 30A, only when necessary.

Figure 2:
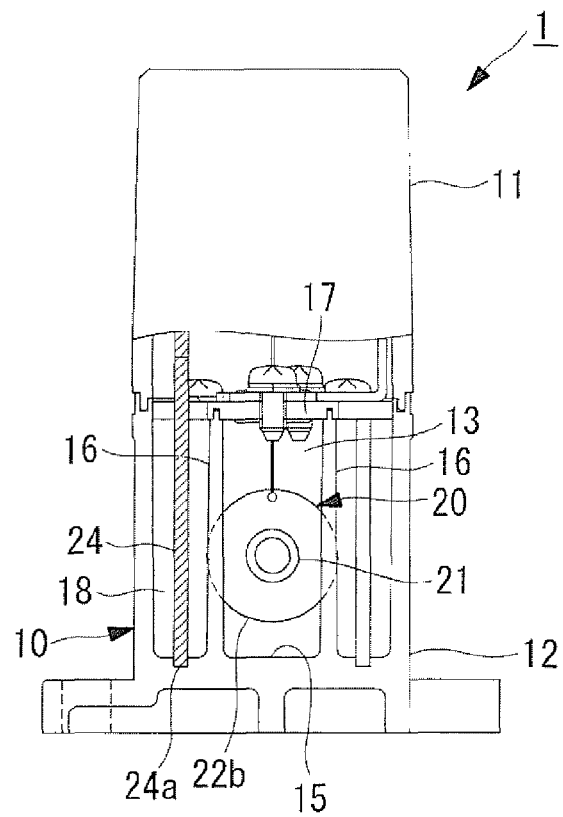
FIG. 2 is a cross-sectional view taken along line A-A shown in FIG. 1.
Figure 3:
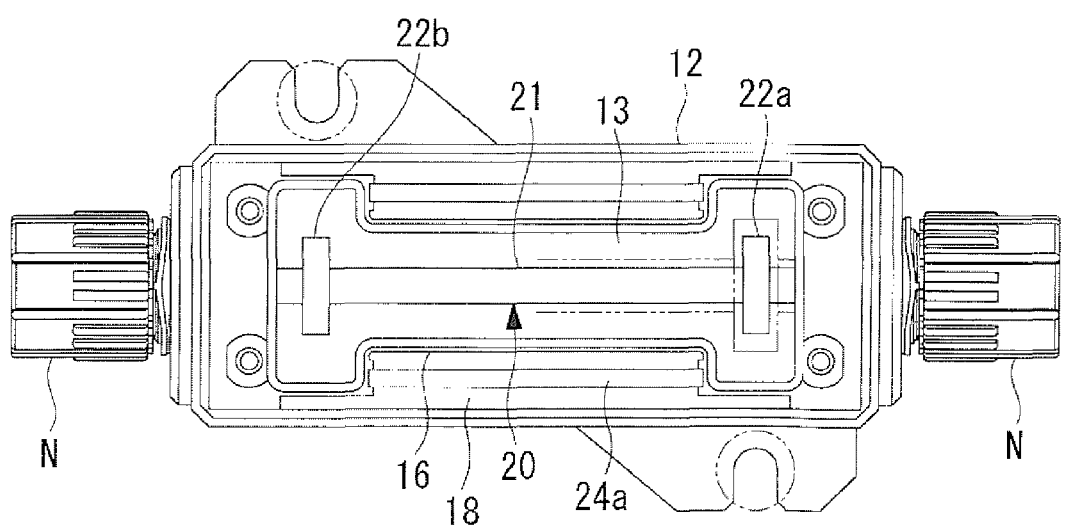
FIG. 3 is a plan view illustrating the straight tube ultrasonic flow meter shown in FIG. 1 from which an upper casing and a control board are removed.

The measurement space 13 is a space for containing only the measuring unit 20, and is substantially sealed by being enclosed by a bottom portion 15, a vertical wall 16 that defines side of the space, and a partition plate 17 that partitions an upper portion of the space, for example, as shown in FIG. 2 and FIG. 3. In the measurement space 13, the single tubular body for measurement 21 that constitutes the measuring unit 20 is horizontally placed. It should be noted that a planar shape of the space defined by the vertical wall 16 is substantially an "H" shape as shown in FIG. 3, and an upper end of the space is covered by the removable partition plate 17.

The tubular body for measurement 21 is a straight tube, and the pair of oscillators 22a and 22b are provided around the outer circumference at the predetermined interval along the axial direction. In the following description, the oscillators are distinguished when necessary by representing one of the oscillators on an upstream side by the reference numeral 22a and the other oscillator on a downstream side by the reference numeral 22b, but simply referred to as the oscillators 22 when it is not necessary to distinguish between the oscillators. Here, each of the oscillators 22a and 22b is connected to a control board 24 via wiring 23. A gasket for sealing 25 is provided for a portion of the partition plate 17 through which the wiring 23 penetrates.

The control board 24 is installed within a board placement space 26 provided outside the measurement space 13. According to the configuration shown by the drawings, the control board 24 is disposed vertically in order to downsize the straight tube ultrasonic flow meter 1, and thus the control board 24 is provided next to the tubular body for measurement 21. Therefore, in order to prevent the fluid for measurement such as a drug solution from being brought into contact with the control board 24 and becoming a cause of damage, the measurement space 13 and the board placement space 26 are completely separated by a dividing wall such as the vertical wall 16. Here, a reference numeral 24a in the figure represents a groove that supports an end portion of the control board 24.

Further, external wiring W is provided above the casing 10 in order to electrically connect the control board 24 within the board placement space 26 with an external control device or the like.

Now, the measuring unit protecting joint 30 described above that fixes the tubular body for measurement 21 of the measuring unit 20 to the casing 10 and that connects the tubular body for measurement 21 to the external pipe P serves to restrict movement to a central side (side of the measuring unit 20) in the axial direction and rotation with respect to the casing 10, as well as to provide a fluid flow channel 31a. In other words, the measuring unit protecting joint 30 provides a structure in which the tubular body for measurement 21 is solely contained within the casing 10, and serves not to apply an external stress to the measuring unit 20 configured by the tubular body for measurement 21 and the pair of oscillators 22.

Figure 4:
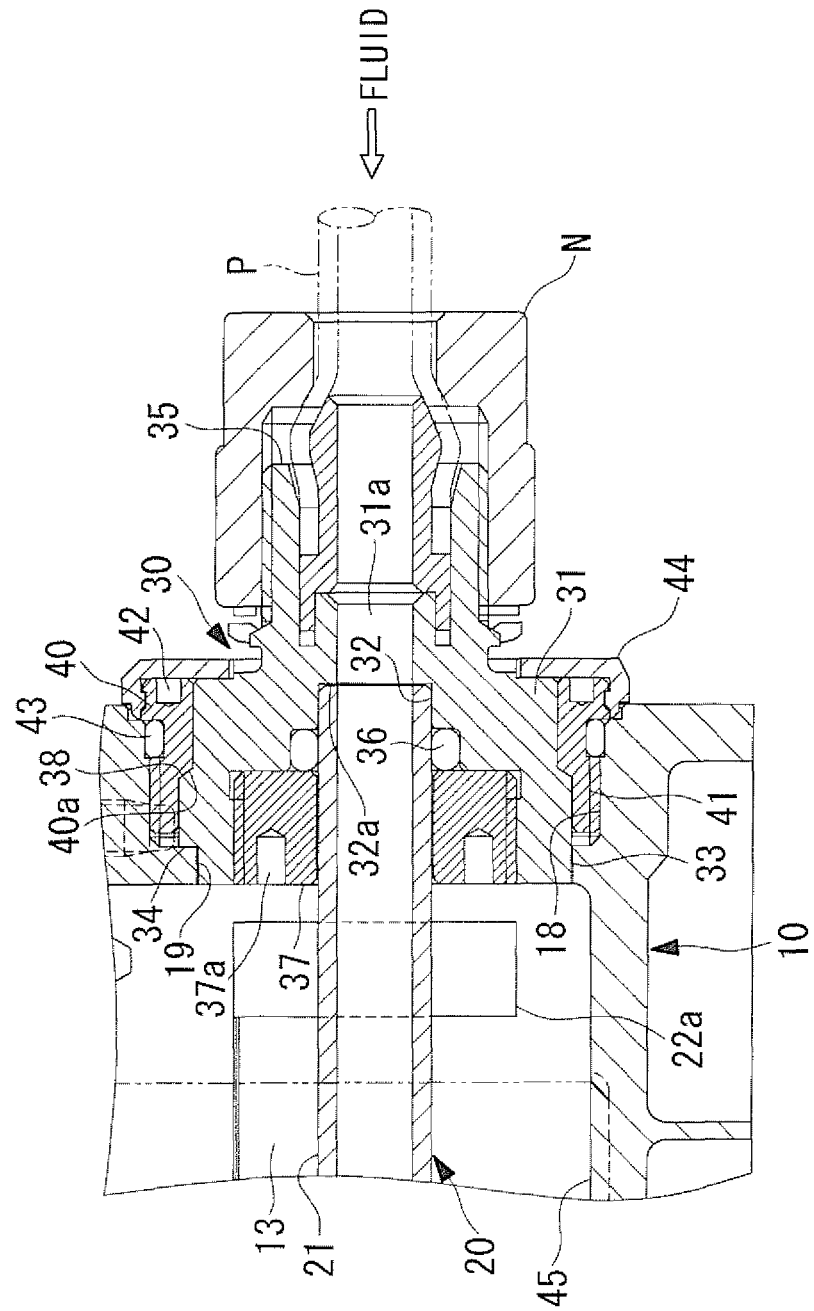
FIG. 4 is a cross-sectional view of an enlarged main part enlarging a structure around a measuring unit protecting joint on an upstream side of the straight tube ultrasonic flow meter shown in FIG. 1.

As shown in an enlarged view of FIG. 4, the measuring unit protecting joint 30 includes a protecting joint main body 31 that defines the fluid flow channel 31a centering an axis, and a fixation ring 40 that engages with an inside screw section 18 provided in the vertical wall 16 as a wall surface of the casing 10 and thereby prevents the protecting joint main body 31 from moving in the axial direction.

The protecting joint main body 31 includes a pipe supporting section 32 that inserts the tubular body for measurement 21 to a predetermined position and supports the tubular body for measurement 21 by a portion in the vicinity of an end portion, a casing opening insertion section 33 that is inserted into and assembled with a wall surface opening 19 having a cross-sectional shape for restricting rotation and provided in the casing 10, the casing opening insertion section 33 having a cross-sectional shape identical to the cross-sectional shape for restricting rotation, a contact surface 34 that defines an insertion position of the casing opening insertion section 33 to the central side in the axial direction, and a pipe joint section 35 that is connected to the external pipe P of the fluid for measurement.

The pipe supporting section 32 is a columnar cylindrical space provided outwardly from an oscillator-side side surface of the protecting joint main body 31 to a side to which the external pipe P is connected, and an inner diameter of the pipe supporting section 32 is such that the tubular body for measurement 21 can be inserted therein. The pipe supporting section 32 includes a stepped surface 32a at its external end portion so as to define an amount by which the tubular body for measurement 21 is inserted.

According to the illustrated configuration, an O ring 36 is attached around an outer circumference surface of the tubular body for measurement 21, in order to seal an inner flow channel of the tubular body for measurement 21 inserted into the protecting joint main body 31, that is, in order to prevent the fluid for measurement from leaking through the outer circumference surface of the tubular body for measurement 21 inserted into the measuring unit protecting joint 30.

In this embodiment, an O ring removing member 37 is separately provided in order to facilitate removal and attachment of the O ring 36 described above. The O ring removing member 37 separates a ring shaped member from the oscillator-side side surface of the protecting joint main body 31, and makes the O ring removing member 37 removable by screwing the protecting joint main body 31 and the ring shaped member with each other. It should be noted that the O ring removing member 37 is removed or attached by rotating a tool having a plurality of projections (not depicted) that are inserted into a plurality of tooling holes 37a provided along a circumferential direction in an oscillator-side side surface of the O ring removing member 37.

Providing the O ring removing member 37 described above allows to provide a hole of a large diameter through which the O ring 36 is removed and attached in a state in which the O ring removing member 37 is removed. However, the O ring removing member 37 is required when a diameter of the tubular body for measurement 21 is small and providing a problem in workability, and is not necessary when the diameter of the tubular body for measurement 21 is large.

Specifically, if the diameter of the tubular body for measurement 21 is small, a diameter of the pipe supporting section 32 that matches an outer diameter of the tubular body for measurement 21 also becomes small, and thus the hole diameter of the space used for removing and attaching the O ring 36 becomes small. This makes the removal and attachment of the O ring 36 difficult. Therefore, by separating the ring shaped member from the protecting joint main body 31 and providing the O ring removing member 37, it is possible to secure a hole of a large diameter for removing and attaching the O ring when the O ring removing member 37 is removed.

Figure 6:
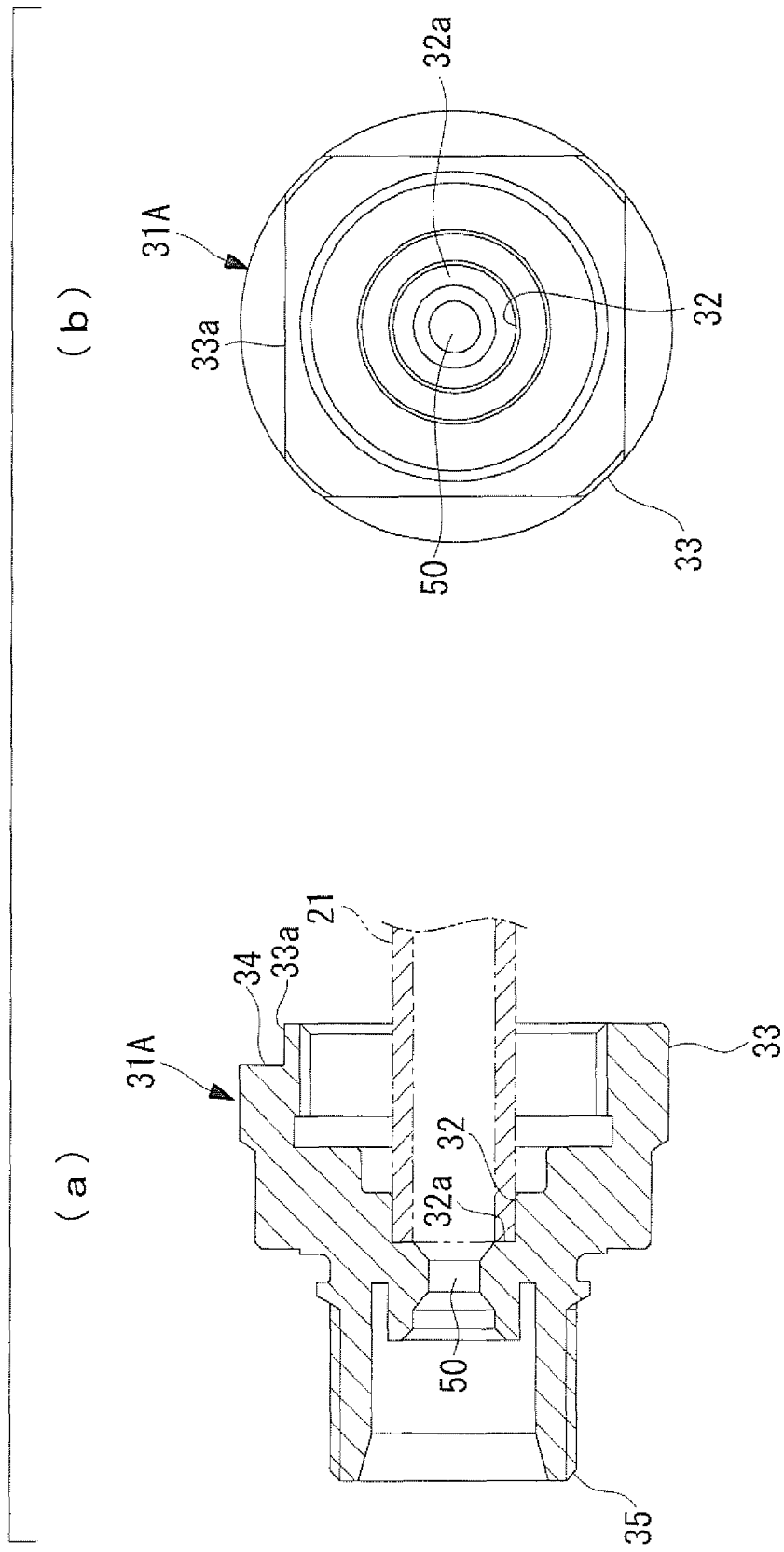
FIG. 6($a$) is an enlarged view of the air bubble crushing section shown in FIG. 5, and FIG. 6($b$) is a right side view of FIG. 6($a$).

The casing opening insertion section 33 has the cross-sectional shape for restricting rotation where a substantial rectangular shape having four chamfered sections 33a is combined with a cylindrical shape, as shown in FIG. 6, for example. The casing opening insertion section 33 is inserted into the wall surface opening 19 having the cross-sectional shape for restricting rotation that opens in the vertical wall 16 defining the measurement space 13 within the casing 10, and thereby prevents the protecting joint main body 31 from rotating with respect to the casing 10.

It should be noted that FIG. 6 shows a state in which the O ring 36 and the O ring removing member 37 are removed. The cross-sectional shape for restricting rotation can be polygonal, and is not limited to the example shown in the figure.

The contact surface 34 is a stepped surface provided for the protecting joint main body 31, and is a portion that is brought into contact with a peripheral surface of the wall surface opening 19 provided in the casing 10, and prevents a thrust load exerted by the external pipe P from being transmitted to the tubular body for measurement 21. The contact surface 34 is provided using an end surface of a portion that extends from the casing opening insertion section 33 having the cross-sectional shape for restricting rotation to the protecting joint main body 31 having a normal cross section.

The contact surface 34 prevents a stress of the thrust load by the external pipe P from acting on the tubular body for measurement 21, and engagement of the contact surface 34 with the peripheral surface provided on a side of the casing 10 restricts the movement of the tubular body for measurement 21 toward the oscillator 22 along the axial direction.

The pipe joint section 35 is a portion connected to the external pipe P through which the fluid for measurement flows, using a commercially available piping joint. In the illustrated configuration, a standard piping joint N that is commonly used for connecting a copper pipe is used.

The fixation ring 40 is a member for fixing the protecting joint main body 31 by screwing an outside screw section 41 into the inside screw section 18 in the vertical wall 16 as an attachment hole of the casing 10. The fixation ring 40 includes a plurality of tool engagement holes 42 provided along a circumferential direction in an outer end surface of the fixation ring 40. In the drawing, a reference numeral 43 represents an O ring for sealing.

The fixation ring 40 is removed or attached by rotating the fixation ring 40 using a tool having projections that are engaged with the tool engagement holes 42 (not depicted).

Screwing the fixation ring 40 into a predetermined position causes a stepped section 40a provided for an inner periphery surface to be engaged with a stepped section 38 provided for an outer circumference of the protecting joint main body 31, and thus it is possible to prevent the protecting joint main body 31 from moving along the axial direction.

It should be noted that a removable covering member 44 is attached to an exterior of the fixation ring 40 for aesthetic purposes such as concealing the tool engagement holes 42, for example.

As described above, on either side of the casing 10, as a piping joint that connects the external pipe P through which the fluid for measurement is introduced into and flowed out from the straight tube ultrasonic flow meter 1, there is provided the measuring unit protecting joint 30 configured to serve to restrict movement to the central side (side of the measuring unit 20) in the axial direction and rotation with respect to the casing 10. Therefore, it is possible to prevent a stress in the axial direction or a rotational direction by the external pipe P from acting on the measuring unit 20.

Specifically, according to the measuring unit protecting joint 30 thus configured, the rotation of the protecting joint main body 31 is prevented by the engagement between the wall surface opening 19 and the casing opening insertion section 33 both having the cross-sectional shape for restricting rotation, and the movement of the protecting joint main body 31 toward the measuring unit 20 is prevented by the engagement between the contact surface 34 and the peripheral surface of the wall surface opening 19 as a casing wall surface. As a result, there is provided a structure in which a thrust force or a rotational force from the external pipe P does not act on the tubular body for measurement 21, and in which the measuring unit 20 is separated from the external pipe P in terms of the stress. Therefore, an influence of the external vibration which is one of the error causes is eliminated from the measuring unit 20 that measures a flow rate using ultrasonic wave.

Figure 5:
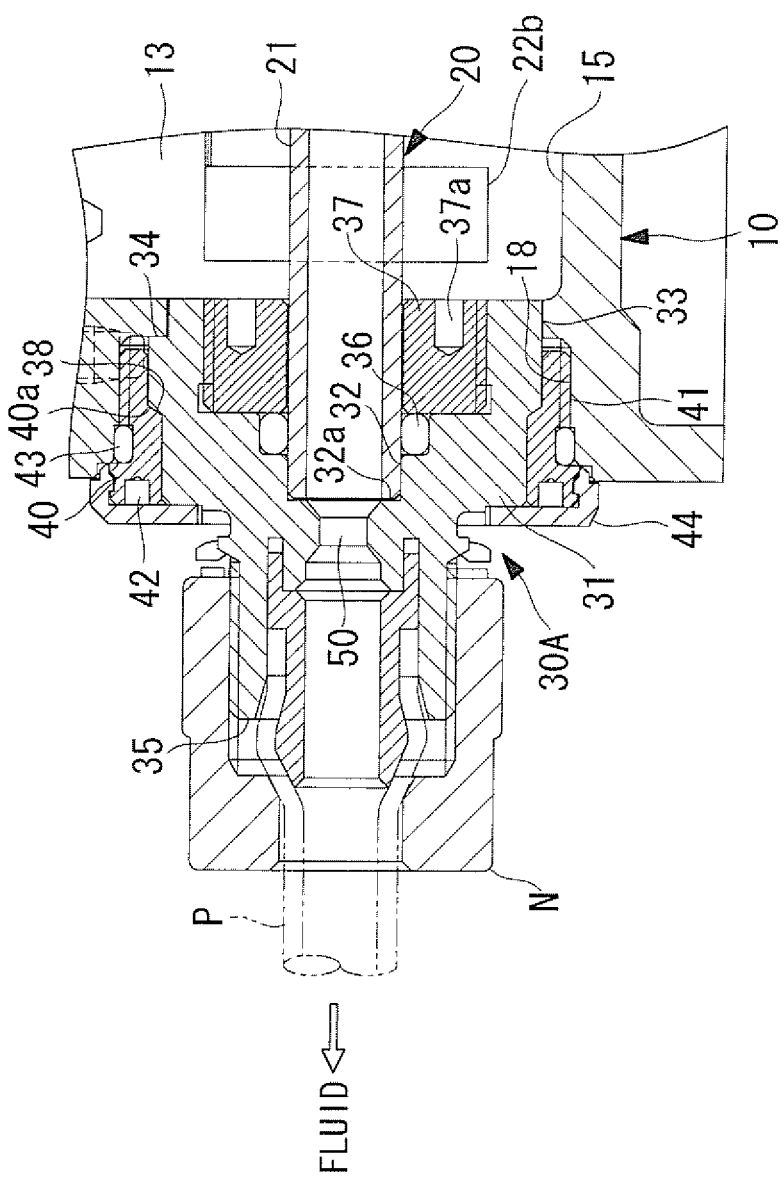
FIG. 5 is a cross-sectional view of an enlarged main part enlarging a structure around a measuring unit protecting joint having an air bubble crushing section, provided on a downstream side of the straight tube ultrasonic flow meter shown in FIG. 1.

In the mean time, it is desirable that the measuring unit 20 described above be provided with the contracted section 50 that constitutes an air bubble crushing section on the downstream side of the oscillators 22. The contracted section 50 serves to crush and remove small air bubbles that gather around an inner wall surface of the tubular body for measurement 21, as a pressure within the flow channel increases by decreasing a cross-sectional area of the flow channel. The contracted section 50 shown in FIG. 1, FIG. 5, and FIG. 6 is provided monolithically with the protecting joint main body 31A of the measuring unit protecting joint 30A so as to be coaxial with the tubular body for measurement 21.

The small air bubbles that gather around the inner wall surface of the tubular body for measurement 21, in particular, are generated when the flow rate is small, and provides an error cause in the measurement of the flow rate using ultrasonic wave. Accordingly, crushing and removing small air bubbles eliminate an error cause in the measurement of the flow rate using ultrasonic wave.

In this case, in order to reliably crush the air bubbles, it is desirable that the cross-sectional area of the flow channel of the contracted section 50 be in a range from 10% to 75% of that of the tubular body for measurement 21.

When the cross-sectional area of the flow channel of the contracted section 50 described above is small, such as about 10% of that of the tubular body for measurement 21, a minimum cross section of the flow channel through which a liquid for measurement flows becomes extremely small. Therefore, the flow channel of the tubular body for measurement 21 is susceptible to clogging due to a foreign matter that flows along with the fluid for measurement. Accordingly, a lower limit (minimum diameter) of the contracted section 50 takes a value with which the fluid for measurement flows smoothly without clogging, and thus, the lower limit of the contraction varies according to the pipe diameter of the tubular body for measurement 21.

On the other hand, when the cross-sectional area of the flow channel of the contracted section 50 described above is large, such as about 75% of that of the tubular body for measurement 21, the cross section of the flow channel through which a liquid for measurement flows changes only a little. Therefore, the pressure changes only a little, and it is difficult to reliably crush the air bubbles.

Figure 7:
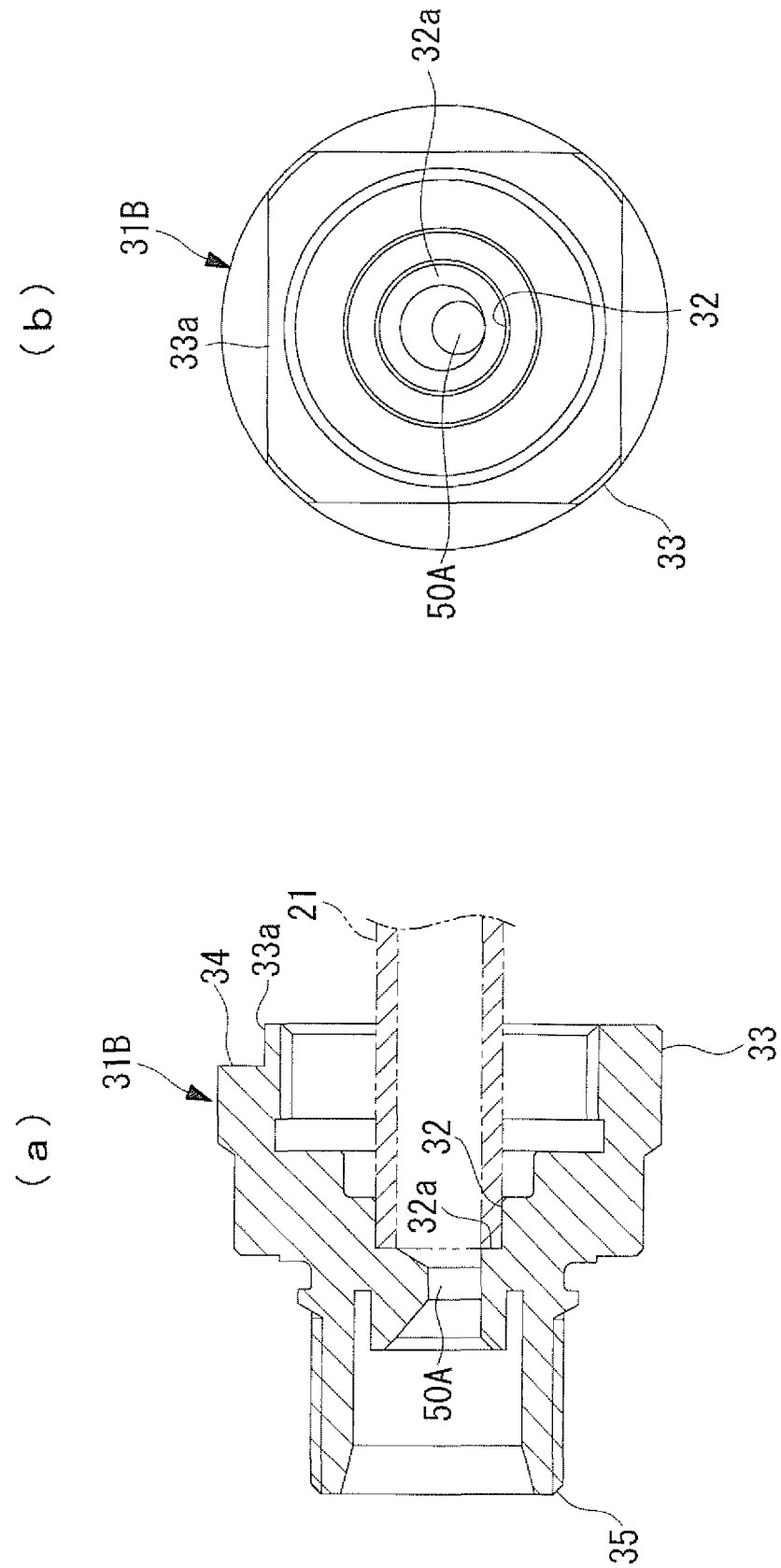
FIG. 7($a$) and FIG. 7($b$) are views illustrating a first modified example of the air bubble crushing section.

Further, a contracted section 50A according to a first modified example shown in FIG. 7 is effective in particular when the measuring unit 20 is placed horizontally. In this case, there is provided a protecting joint main body 31B having a structure in which a central axis of the contracted section 50A is positioned downward such that a lower surface of the flow channel in the contracted section 50A is even with that of the tubular body for measurement 21. The contracted section 50A thus configured does not include a step in the lower surface of the flow channel, and facilitates removal of a remaining object within the tubular body for measurement 21, for example, in the maintenance such as cleaning.

Figure 8:
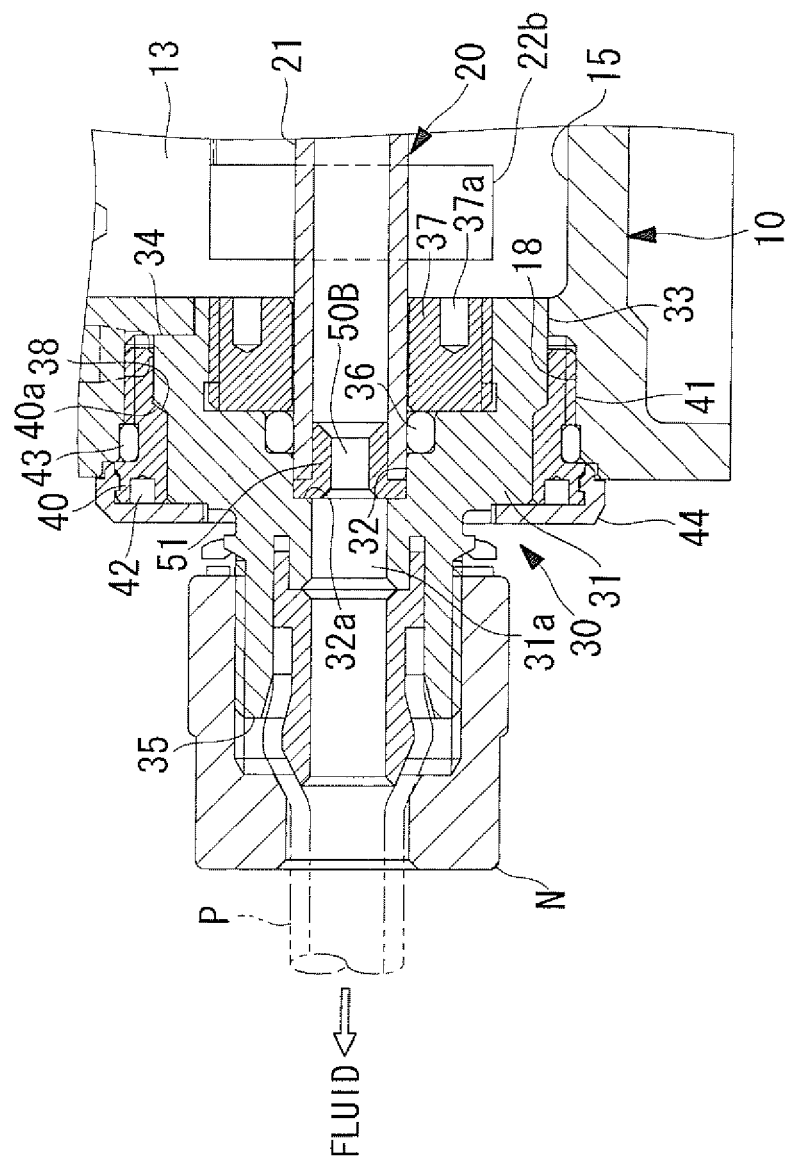
FIG. 8 is a cross-sectional view illustrating a second modified example in which an air bubble crushing section is provided in a tubular body for measurement, enlarging a structure around a measuring unit protecting joint on a downstream side.

Moreover, a contracted section 50B according to a second modified example shown in FIG. 8 is provided removably by inserting a contraction providing member 51 into a downstream outlet of the tubular body for measurement 21. With such a configuration, it is possible to easily change the cross-sectional area of the flow channel of the contracted section 50B by removing the contraction providing members 51 and appropriately replacing with one having a different cross-sectional area of the flow channel (contraction rate).

As described above, according to the embodiment and its modified examples, it is possible to reduce or eliminate the error causes in the ultrasonic wave measurement, such as the stress by the external vibration acting on the tubular body for measurement 21 and the air bubbles gathering around the inner wall surface. Therefore, accuracy in the measurement of the flow rate using ultrasonic wave can be further improved.

It should be appreciated that the present invention is not limited to the embodiment described above, and can be modified appropriately without departing the spirit of the invention.

REFERENCE SIGNS LIST

1 Straight Tube Ultrasonic Flow Meter
10 Casing
13 Measurement Space
14 Inside Screw Opening
16 Vertical Wall
18 Inside Screw Section
19 Wall Surface Opening
20 Measuring Unit
21 Tubular Body For Measurement
22, 22a, 22b Oscillator
24 Control Board
30, 30A Measuring Unit Protecting Joint
31, 31A, 31B Protecting Joint Main Body
31a Fluid Flow Channel
32 Pipe Supporting Section
33 Casing Opening Insertion Section
33a Chamfered Section
34 Contact Surface
35 Pipe Joint Section
37 O Ring Removing Member
40 Fixation Ring
41 Outside Screw Section
44 Covering Member
50, 50A, 50B Contracted Section
51 Contraction Providing Member
P External Pipe

The invention claimed is:

1. A straight tube ultrasonic flow meter comprising a measuring unit disposed within a measurement space of a casing, the measuring unit comprising a tubular body for measurement as a straight tube through which a fluid for measurement flows and a pair of oscillators disposed around an outer circumference of the tubular body for measurement at a predetermined interval along an axial direction, the measuring unit measuring a flow rate of the fluid by obtaining a flow velocity of the fluid for measurement based on a difference in propagation time of ultrasonic waves from both directions detected between the oscillators, wherein the straight tube ultrasonic flow meter further comprises a measuring unit protecting joint which is interposed between the measuring unit, the casing and an external pipe, wherein the measuring unit protecting joint has a protecting joint main body;

wherein the protecting joint main body includes a pipe supporting section in which the tubular body for measurement is inserted to a predetermined position, wherein the tubular body for measurement and the external pipe are connected to form a fluid channel at the pipe supporting section, and wherein the measuring unit protecting joint restricts movement of the tubular body for measurement of the measuring unit in the axial direction and rotation of the measuring unit with respect to the casing through the pipe supporting section.

2. The straight tube ultrasonic flow meter according to claim 1, wherein the protecting joint main body further comprises a casing opening insertion section that is inserted into and assembled with an opening provided in a wall surface of the casing, the opening having a cross-sectional shape for restricting rotation, the casing opening insertion section having a cross-sectional shape identical to the cross-sectional shape for restricting rotation; a contact surface that defines an insertion position of the casing opening insertion section to a central side in the axial direction; and a pipe joint section that is connected to the external pipe for the fluid for measurement; and the measuring unit protecting joint further comprising a fixation ring configured to engage with an inside screw section provided in the wall surface of the casing and prevent the protecting joint main body from moving in the axial direction.

3. The straight tube ultrasonic flow meter according to claim 1, wherein the measuring unit further comprises an air bubble crushing section on a downstream side of the oscillators.

4. The straight tube ultrasonic flow meter according to claim 3, wherein the air bubble crushing section is provided for the measuring unit protecting joint.

5. The straight tube ultrasonic flow meter according to claim 4, wherein the measuring unit is placed horizontally, and a central axis of the air bubble crushing section is positioned downward such that a lower surface of a flow channel in the air bubble crushing section is even with that of the tubular body for measurement.

6. The straight tube ultrasonic flow meter according to claim 3, wherein the air bubble crushing section is provided removably by inserting a contraction providing member into a downstream outlet of the tubular body for measurement.

7. The straight tube ultrasonic flow meter according to claim 6, wherein the measuring unit is placed horizontally, and a central axis of the air bubble crushing section is positioned downward such that a lower surface of a flow channel in the air bubble crushing section is even with that of the tubular body for measurement.

* * * * *